United States Patent
Blevins et al.

(10) Patent No.: US 9,932,718 B2
(45) Date of Patent: Apr. 3, 2018

(54) ANCHORING AND STABILIZING DEVICE FOR MANUFACTURED HOMES

(71) Applicant: Home Pride, Inc., Nashville, TN (US)

(72) Inventors: Brad Blevins, Nashville, TN (US); Andy Oliphant, Brentwood, TN (US); Claude Hammonds, Duffield, VA (US); Locke Jones, Canton, NC (US)

(73) Assignee: Home Pride, Inc., Nashville, TN (US)

( * ) Notice: Subject to any disclaimer, the term of this patent is extended or adjusted under 35 U.S.C. 154(b) by 0 days.

(21) Appl. No.: 14/998,734

(22) Filed: Feb. 8, 2016

(65) Prior Publication Data

US 2017/0226713 A1    Aug. 10, 2017

(51) Int. Cl.
| | |
|---|---|
| *E02D 5/74* | (2006.01) |
| *E02D 5/80* | (2006.01) |
| *E04H 9/02* | (2006.01) |
| *E04H 9/14* | (2006.01) |
| *E04B 1/343* | (2006.01) |
| *E04H 12/22* | (2006.01) |

(52) U.S. Cl.
CPC .......... *E02D 5/801* (2013.01); *E04B 1/34347* (2013.01); *E04H 9/021* (2013.01); *E04H 9/14* (2013.01); *E04H 12/2223* (2013.01)

(58) Field of Classification Search
CPC ....... E02D 5/801; E04B 1/34347; E04B 1/98; E04H 9/021; E04H 9/14
USPC ........................... 52/157, 155, 161, 156, 165
See application file for complete search history.

(56) References Cited

U.S. PATENT DOCUMENTS

| | | | |
|---|---|---|---|
| 315,593 A | 4/1885 | Boehmke et al. | |
| 4,310,090 A * | 1/1982 | Mackarvich | B65D 85/62 |
| | | | 206/343 |
| 4,429,854 A | 2/1984 | DeJager | |
| D287,460 S | 12/1986 | MacKarvich | |
| 4,923,165 A * | 5/1990 | Cockman | E04H 12/2223 |
| | | | 248/156 |

(Continued)

OTHER PUBLICATIONS http://www.flhsmv.gov/dmv/forms/BMHRV/15C1Fini.pdf, "Rules of Department of Highway Safety and Motor Vehicles Division of Motor Vehicles Chapter 15C-1" pp. 1-34.

(Continued)

*Primary Examiner* — Brian E Glessner
*Assistant Examiner* — Joshua K Ihezie
(74) *Attorney, Agent, or Firm* — Mark L. Davis

(57) ABSTRACT

An augerable ground anchor having: a) a shaft having a first end and a distal second end; b) an augering means affixed about said shaft adjacent to said first end; c) a ground contact plate affixed to said shaft proximate to said second end; d) a first anchor means affixed to said contact plate for securing a manufactured home sidewall strap to said ground anchor, said first anchor means being centrally positioned and having a first longitudinal axis and; e) a second anchor means for securing a stabilizing strut to said ground anchor, the second anchoring means being affixed to the contact plate outboard from the first anchor means and having a second longitudinal axis, wherein the first and second longitudinal axis are at a first acute angle Ø. An anchoring and stabilizing assembly is further described that further includes a stabilizing plate adjacent to and in contact with the shaft.

10 Claims, 10 Drawing Sheets

(56) References Cited

U.S. PATENT DOCUMENTS

| | | | |
|---|---|---|---|
| 4,928,446 A * | 5/1990 | Alexander, Sr. | E02D 5/801 40/610 |
| 5,113,627 A * | 5/1992 | Jarrett, Sr. | E02D 5/801 248/156 |
| 5,575,308 A * | 11/1996 | Marandi | E04H 12/2215 137/356 |
| 5,784,844 A | 7/1998 | MacKarvich | |
| 6,128,867 A * | 10/2000 | MacKarvich | E02D 5/801 52/155 |
| 6,247,276 B1 | 6/2001 | Masters et al. | |
| 6,272,798 B1 * | 8/2001 | Cockman | E02D 5/801 135/118 |
| 6,318,032 B2 | 11/2001 | MacKarvich | |
| 6,334,279 B1 | 1/2002 | Oliver et al. | |
| 6,334,281 B1 | 1/2002 | Oliver et al. | |
| 6,343,449 B1 | 2/2002 | MacKarvich | |
| 6,418,685 B1 | 7/2002 | Oliver et al. | |
| 6,449,920 B1 | 9/2002 | Richard | |
| 6,505,447 B1 | 1/2003 | Oliver et al. | |
| 6,622,439 B2 * | 9/2003 | Moreno, Jr. | E02D 27/01 52/155 |
| 6,634,150 B1 | 10/2003 | Oliver et al. | |
| 6,735,911 B1 * | 5/2004 | Alexander | E02D 5/80 248/500 |
| 6,971,209 B1 | 2/2005 | Blevins | |
| 6,871,455 B1 | 3/2005 | Cockman et al. | |
| 7,140,157 B2 | 11/2006 | Oliver et al. | |
| 7,526,899 B1 | 5/2009 | Oliver et al. | |
| 8,833,020 B2 | 9/2014 | Oliver et al. | |
| 8,844,209 B1 * | 9/2014 | Oliver | E02D 27/50 52/157 |
| 8,845,236 B1 | 9/2014 | Dosdourian et al. | |
| 8,919,060 B1 | 12/2014 | Oliver et al. | |
| 2002/0170253 A1 * | 11/2002 | MacKarvich | E02D 27/02 52/292 |
| 2003/0213197 A1 | 11/2003 | Oliver et al. | |
| 2004/0148877 A1 * | 8/2004 | Roberts | E02D 5/80 52/155 |
| 2010/0307073 A1 | 12/2010 | Oliver et al. | |
| 2011/0036025 A1 * | 2/2011 | Boulay | E02D 5/801 52/157 |
| 2014/0020310 A1 * | 1/2014 | Lee | E02D 7/22 52/157 |
| 2016/0168815 A1 * | 6/2016 | Kemp | E02D 5/801 52/157 |

OTHER PUBLICATIONS

Minute Man Products—LLBS Foundation Bracing, catalog pp. 1-6.
Mooile Home Depot, stabilizing plates/caps, http://mobilehomedepotmi.com/mh_catalog1/stabilizer-plate.html, pp. 1-2.
Minute Man Products—Anchors, catalog pp. 1-4.

* cited by examiner

ANCHORING AND STABILIZING DEVICE FOR MANUFACTURED HOMES

BACKGROUND OF THE INVENTION

1. Field of the Invention

The present invention relates to the area of manufactured homes, and particularly to an augerable anchoring and stabilizing device for a manufactured home. In one aspect, the augerable ground anchor comprising a shaft, a helix affixed proximate one end of the shaft and a ground contact plate affixed at an opposing end of the shaft. The contact plate includes a first anchoring means for securing a side wall anchoring strap of the manufactured home to the ground anchor and a second anchoring means for anchoring a stabilizing strut from the manufactured home to the ground anchor. In another aspect, the invention is directed to an anchor assembly utilizing the augerable ground anchor and a stabilizing means movably affixed to the ground audio shaft. Yet another aspect of the invention is a method for stabilizing a manufactured home against wind movement.

2. Description of the Prior Art

Manufactured buildings, such as mobile homes, trailers, prefabricated houses, and the like are manufactured at a central manufacturing site. Upon completion, the buildings are moved to a location where they are to be occupied. Because these buildings are designed to be easily moved from the manufacturing site to the occupying location, they are built on a pair of parallel I-beam joists. The manufactured building is transported to and mounted upon vertical supports or piers, such as concrete masonry piers, prefabricated steel piers, or precast concrete jack stands located under the parallel joists of the main frame of the manufactured building, with the vertical supports being spaced longitudinally along the parallel joists at approximately eight (8) foot intervals.

It is important that the building also be anchored in position on the piers, so as to avoid the building being shifted off of the piers by strong winds or earth tremors. A building inadvertently shifted off of the piers can cause serious damage to the building and also can cause human injury.

Various types of stabilizing devices have been used to stabilize the manufactured buildings to keep the buildings from shifting off their piers in response to wind forces and earth movement. Non-limiting examples include guide wires, straps or other ties that connect the building to anchors or ground fixtures. One method for providing lateral wind displacement of manufactured buildings consists of using a plurality of tension straps and ground anchors to tether the manufactured home to the ground. In these systems, the tension straps typically extend downwardly from the support beams of the manufactured home frame to ground anchors that are deeply embedded into the soil. In one method, the tension straps are securely connected to the beams with strap connector assemblies that latch onto the support beams. Normally, a strap connector assembly comprises a metal clamp member that includes a hook that securely grips an upper flange of the support beam. The tension straps usually are threaded through a strap slot formed in the clamp member These strap slots normally arc configured so as to be parallel to the hook and the longitudinal direction of the manufactured home, such that the tension straps can be positioned substantially perpendicularly to the longitudinal direction of the manufactured home.

Typically, the ground anchor includes a shaft with one or more helical plates at the bottom of the shaft that is rotated or augered into the earth. An example of such an anchor is illustrated and described in U.S. Pat. No. 6,971,209 issued on Dec. 6, 2005 and assigned to Home Pride, Inc., the entire disclosure of which is incorporated herein by reference. Generally, such anchors have an elongated steel shaft with at least one helically shaped auger blade fixedly attached to the lower end of the shaft and an anchor head or drive head affixed at the upper end for positioning above the ground. The anchor or drive head includes at least one aperture or opening for inserting a split bolt. During installation, the anchor head is utilized as a drive attachment to drive the shaft and the helically shaped auger blade. The anchor shaft is rotated in a direction in which the auger blades penetrate the ground and forcibly drive the anchor shaft in a downward direction. The rotation of the anchor shaft is effected by attaching a driving means, such as an electric, gasoline, or hydraulic motor, to the head and turning the shaft, simultaneously applying a downward force on the anchor to drive the anchor to a predetermined depth in the ground.

An example of such an anchor system used to secure a manufactured home is disclosed in U.S. Pat. No. 6,343,449. As shown in FIG. 1, the manufactured home is supported by a frame that typically includes at least two parallel support steel I-beams 16 and a plurality of concrete block support piers 18 aligned along the lengths of the beams 16. The stabilizing system 12 includes a plurality of augerable ground anchors 13, each having an anchor or drive head 22 secured to the upper end of a shaft 23 which is further adapted for attaching a tension strap 26 to the anchor. As indicated in FIG. 1, the tension strap 26 can extend from the ground anchor upwardly about the outer periphery of the manufactured home or, in addition to or alternatively, a second tension strap 24 can connect to the support beams 16 of the manufactured home frame. The tensioned strap applies a downward force to the I-beams.

One issue with such an anchor system is that it does not provide sufficient resistance to longitudinal and lateral movement of the manufactured home during high wind gusts or during earth movement. Such anchors are typically installed vertically or even with a slight back angle just inside the perimeter of the home. The portion of the anchor that contacts the soil, i.e., the shaft and the anchor head, and used for fastening the tension strap has a relatively small surface area. Thus, when the anchor is pulled laterally by wind the upper end of the anchor presents only minimal resistance to the force and tends to bend toward the manufactured home, allowing the home to shift and a possible catastrophic loss of anchor stability.

Another issue with this type of anchoring system is that the tensioning strap received by openings in the anchor head generally have right angled edges, and consequently when a tension strap is bent around such an edge and tension is applied to the strap a sharp bend radius is produced in the tension strap. Tension straps are more likely to become fatigued and break at sharp radii bends than at bends with larger radii.

Yet another issue with such an anchor system is that there is a tendency for the steel anchor straps to break during considerable longitudinal movement of the manufactured home such as may be experienced in earthquakes and hurricanes. The failure of one or more of the anchor straps can then result in catastrophic failure of the support system as the home can become completely dislodged from the piers.

Another method for longitudinal and lateral stabilization of a manufactured home utilizes a system wherein the piers are set on top a pan having a means for attaching a substantially rigid member or brace that traverses a distance from the bottom of the pan to a location on one or both of the support I-beams. An example of such a system is shown in U.S. Pat. No. 4,261,149 which is typical of support systems using a foundation pad, pier, and longitudinal and lateral bracing struts which are secured between the manufactured home and the foundation pad.

Another example of such a system is disclosed in U.S. Pat. No. 6,318,032. As shown in FIG. 2, a manufactured home has a support I-beam 16 on the underside of the building. The I-beam extends the length of the building and is supported above the ground by an upright pier 18. The longitudinal stabilizing system includes a foundation pad 61, a joist connector 62, a plate connector 64, and a strut 68. The system may also be configured to utilize a second joist connector 62b, a second plate connector 64b, and a second strut 68b installed on the opposite side of the pier 18.

Another example of such a system is disclosed in U.S. Pat. No. 6,622,439. This anchoring system utilizes a foundation plate having a lower surface for contacting the ground, and an upper surface on which the pier is supported. Brace struts are connected between the chassis of the manufactured home and the foundation plates and extend both longitudinally and laterally.

An issue associated with such longitudinal and lateral stabilization systems is they are very cumbersome. When using non-concrete plates, anchoring of the plates into the ground is required before the pier is constructed and the braces are affixed to the pan. Thus, it is difficult or impossible to reposition the plates for alignment with the pier constructed. The plates have already been secured in the ground by anchors such as spikes or cleat walls. Moreover, when the metal foundation plate is stamped out and the edges are bent down to form walls, the walls are embedded in the soil to prevent the plate from shifting. While this type of plate is secured in shifting laterally and/or longitudinally, it is difficult to adjust the position of the plate once it has been embedded in the soil and the weight of the pier rests on the foundation plate.

Another issue with the aforementioned longitudinal and lateral stabilizing devices which utilize a pan system is that during high winds the lift exerted on manufactured home to shift it longitudinally and/or laterally from one or more piers is principally only the weight of the home itself The lift increases as wind speed increases. Thus, the force resisting lateral and longitudinal shift decreases which can result in catastrophic destruction of the home. Although anchors attached to the ground and sidewall anchor straps assist in preventing lift they do not prevent the lateral and longitudinal shift of the manufactured home frame from the piers.

Accordingly, it can be seen that there is still a need for an anchoring and longitudinal and lateral stabilizing device for use in anchoring and stabilizing a manufactured home or other mobile construct that would be easy to install, readily adjustable and provide significant resistance to lateral and longitudinal movement without the problems discussed above.

SUMMARY OF THE INVENTION

Briefly, the present invention is augerable ground anchor having a shaft with a first end and a distal second end; an augering means affixed about the shaft adjacent to the first end; a ground contact plate affixed to the shaft proximate to the second end; a first anchor means affixed to the contact plate for securing a manufactured home side wall strap to the ground anchor, the first anchor means being centrally positioned and having a first longitudinal axis and; and a second anchor means for securing a stabilizing strut to the ground anchor. The second securing means being affixed to the contact plate outboard from the first anchor means and has a second longitudinal axis, wherein the first and second longitudinal axises are at an acute angle.

Another aspect of the invention is for a manufactured home anchoring and stabilizing assembly that includes the augerable ground anchor described above and further includes a stabilizing plate that is positioned adjacent to, and desirably loosely affixed, to the shaft and when installed is adjacent to the shaft and ground contact plate.

Another aspect of the invention is a method for stabilizing a manufactured home against longitudinal and lateral movement utilizing the anchoring and stabilizing assembly of the present invention. Accordingly, in a manufactured home having a frame with at least one longitudinally oriented I-beam and a plurality of vertical side-wall tensioning straps, and wherein the manufactured home includes at least one pier supporting the I-beam, the method includes the steps of providing the anchoring and stabilizing assembly of the present invention; driving the anchoring and stabilizing assembly into the ground at a predetermined location wherein the first anchor means is substantially perpendicular to one of the manufactured home I-beams and the second anchor means is positioned toward the I-beam; and securing a first stabilizing strut to the first anchoring means and a first location on the I-beam and securing a second stabilizing strut to the second anchoring means and to a second location on the same I-beam. Desirably, a sidewall strap can further be secured to the first anchoring means to prevent lift during high winds.

It is an object of the present invention to provide an augerable ground anchor for use in anchoring manufactured home and stabilizing said home from excessive longitudinal and lateral movement during high wind loads or earth movement.

Another object of the present invention is to provide an augerable ground anchor for use in anchoring manufactured home and stabilizing said home from excessive longitudinal and lateral movement during high wind loads or earth movement and one where such anchor and stabilizing device can be readily installed and adjusted independent of the manufactured home position or pier construction.

DETAILED DESCRIPTION OF THE INVENTION

Figure 1:
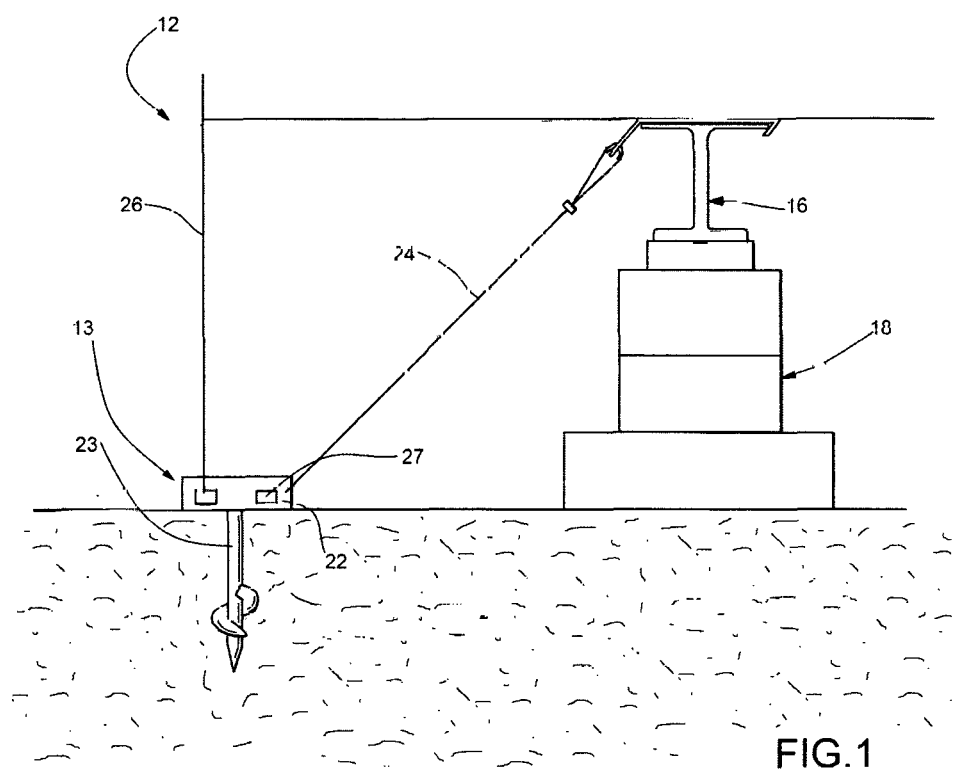
FIG. 1 is an illustration of a prior art anchor as delineated in U.S. Pat. No. 6,343,449 having a head portion with two attachment points; one for affixing a manufactured home side tension strap and a second for attaching a tension strap to the manufactured home supporting I-beam.
Figure 2:
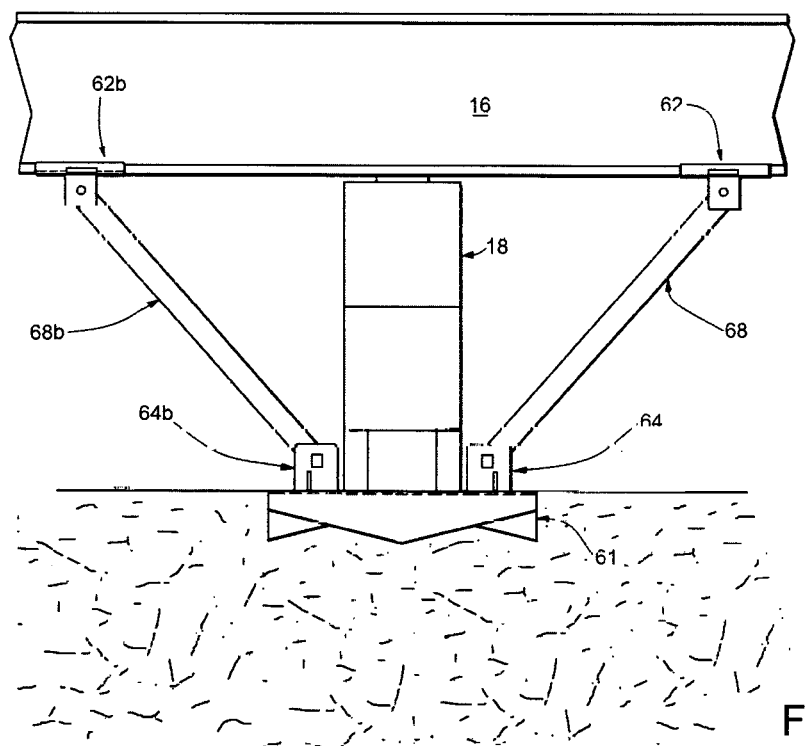
FIG. 2 is an illustration of a prior art longitudinal and lateral stabilizing system as described in U.S. Pat. No. 6,318,032 having a pan wherein a supporting pier of concrete blocks is stacked thereon. The pier pan includes longitudinally aligned connection points for connecting a strut that extends from a predetermined point on the manufactured home I-beam to the connection point on the pier pan.

These and other objects and advantages of the present invention will become more apparent to those skilled in the art in view of the following description and the accompanying drawings wherein like parts and objects in the several views have similar reference numerals. It is to be understood that the inventive concept is not to be considered limited to the constructions disclosed herein but instead by the scope of the appended claims.

As is known and conventional in the manufactured home art is built upon a metal frame portion that generally includes a pair of spaced-apart, parallel I-beams disposed along the underside to which a mobile rigging is attached for moving the manufactured home to where it will be leveled and set over typically, concrete blocks or piers. The manufactured home is then anchored and stabilized against movement. Generally, the manufactured home includes a plurality of sidewall vertical tensioning straps positioned at predetermined locations along the manufactured home's side walls that are utilized to exert a downward force on the manufactured home using a plurality of auger anchors known to those skilled in the art at each such location.

Figure 3:
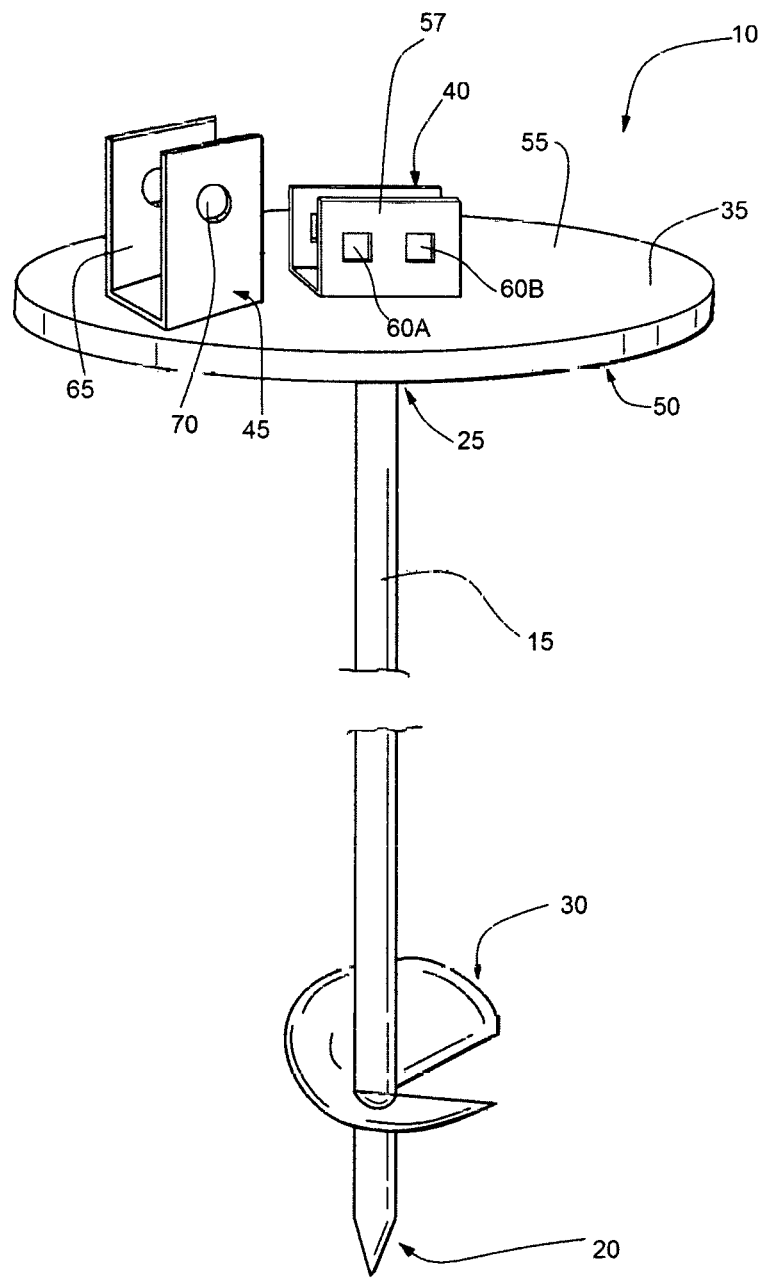
FIG. 3 is a side view of an embodiment of an augerable ground anchor the present invention.
Figure 4A:
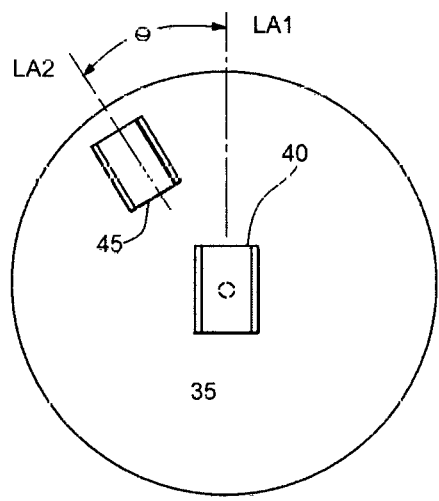
FIG. 4A is a top view of an embodiment of an augerable ground anchor the present invention and is adapted for use on one end of a manufactured home.
Figure 4B:
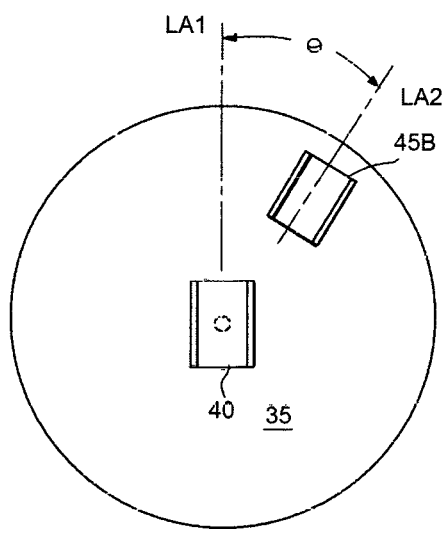
FIG. 4B is a top view of an embodiment of an augerable ground anchor the present invention, which is a mirror image of FIG. 4A, adapted for use on an opposite end of a manufactured home.

Referring now in more detail to the drawings of Figures wherein like parts are represented by the same numeral throughout the several views, FIGS. 3-4B illustrate an augerable ground anchor 10 of the present invention. The augerable ground anchor 10 includes a shaft 15 having a first end 20 and a distal second end 25; an augering means 30 affixed circumferentially about the shaft 15 and positioned adjacent to the first end 20; a ground contact plate 35 affixed to the shaft 15 at or proximate to the second end 25; a first anchor means 40 affixed to the contact plate 35 for securing a manufactured home sidewall strap to the ground anchor 10, and a second anchor means 45 or 45B for securing a manufactured home stabilizing strut to the ground anchor 10.

The shaft or rod 15 generally has a length of from about 2 feet to about 6 feet, or from about 3 feet to about 5 feet, and a diameter of from about 0.5 to about 2.5 inches, or from about 0.75 to about 2.0 inches, or from about 0.75 to about 1.75 inches, or from about 1 inch to about inches and can be fabricated from any material that is suitable for such use. Typically, the shaft or rod 15 is constructed of steel and may further be coated with an anti-rust coating, such as an epoxy paint, powder coated or hot dipped galvanized. Desirably, the first end 20 of the shaft or rod 15 is tapered to facilitate insertion into the ground.

Circumferentially affixed to the shaft or rod 15 and proximate to the first end 20 is the augering means 30, and can be a single helix configuration or a helical disk. The helical disk 30 can be any size of from about 2 inches to about 6 inches in radius, as determined from an edge adjacent the shaft 15 to an outer rim of the disk 30. The helical disk 30 is typically positioned from about 2 to about 10 inches, or from about 2 to 4 inches from the first end 20. The augering means 30 may also be a pair of spaced apart helical disks. Desirably, the portion of the helical disk 30 closest to the first end of the shaft 20 has a sharpened edge to facilitate is cutting into the ground and reduce the torque required for inserting the augerable ground anchor to the desired depth.

Affixed to the distal end 25 of the shaft or rod 15 is a ground contact plate 35. The ground contact plate 35 has a lower surface 50 and an upper surface 55. The lower surface 50 is adapted to be in contact with the ground when the augerable ground anchor 10 is installed; the upper surface 55 is directed upwardly toward the underside of the pier-supported manufactured home when the augerable ground anchor 10 is installed. The ground contact plate 35 can have any planar geometric configuration, such as, for example, square, round, oval, polygon, and the like. Desirably, the ground contact plate 35 is round and has a diameter of from about 4 inches to about 16 inches, or from about 4 inches to about 10 inches, or from about 6 inches to about 10 inches. The ground contact plate 35 can be manufactured from any suitable material that will permit fixed attachment of the various anchoring means described herein below. In a preferred embodiment, the ground contact plate 35 is a steel plate having a thickness of from about 1/16 to 1/2 an inch, or from about 1/16 to about 7/16 of an inch, or from about 1/16 to about 3/8 of an inch, or from about 1/16 to about 5/16 of an inch, or from about 1/16 to about 1/4 of an inch. The ground contact plate 35 may be coated with an anti-rust coating, such as epoxy paint, powder coated or desirably, is hot dipped galvanized.

Attached to the upper surface 55 is a first anchor means 40. The first anchor means 40 is substantially centrally positioned on the upper surface 55 and has a first longitudinal axis LA1. The first anchor means 40 may be fabricated from a substantially planar plate having a pair of substantially parallel upright sides 57 extending perpendicularly from and welded to the edges of the planar plate. Each side 57 includes a first co-axially aligned opening 60A and desirably a second co-axially aligned opening 60B. The first anchor means 40 is designed to secure and engage with the drilling implement during setting of the ground anchor 10 into the ground and then to secure one end of a manufactured home tension strap into the opening 60B. The openings 60A and 60B can be sized and shaped as needed, such as round or square and can be from about 0.25 to about 0.75 of an inch, in diameter if circular, or alone each side if square.

Alternatively, first anchor means 40 may be fabricated from a single piece of flat metal which is bent in a "U" shaped configuration forming the substantially parallel, spaced apart, upwardly-orientated, i.e., away from the ground contact plate 35, sides 57 wherein the openings 60A and/or 60B can first be punched or stamped at a predetermined location and configuration, such as, for example, round, square, rectangular, star, and the like, prior to the flat stock being bent into position and having the bottom or flat portion welded to the upper surface 55.

The first anchor means 40 can be from about 1 to about 6 inches long, and from 1 to 4 inches wide, and each side from about 0.5 to about 4 inches in height; or from about 2.5 to about 5 inches long, from 1.3 to 3 inches wide, and each side from about 0.75 to about 3 inches in height; or about 2.7 to about 4.5 inches long, from 1.5 to 3 inches wide, and each side from about 1.5 to about 3 inches in height; or about 2.8 to about 4.3 inches long, from 1.6 to 3 inches wide, and each side from about 1.75 to about 3 inches in height; or about 2.9 to about 4.3 inches long, from 1.8 to 3 inches wide, and each side from about 2 to about 3 inches in height; or from about 1 to about 4 inches long, from 1 to 3 inches wide, and each side from about 1 to about 3 inches in height; or about 3.4 to about 3.8 inches long, from 2.5 to 3 inches wide, and each side from about 2.5 to about 3 inches in height. Although the above dimensions have been determined to be the most desirable, variations ranging from 5 to 50% in any direction, i.e., length, width and height, is also contemplated by the use of the term "about". It is further understood that the term "substantially" means that the there can be a variance of from 0 to about 25 degrees or percent, or from 0 to about 20, or from 0 to about 15, or from 0 to about 10 or from 0 to about 5 degrees or percent depending upon the unit of measure specified.

Continuing reference to FIGS. 3-4B, the augerable ground anchor 10 further includes a second anchor means 45 or 45B, depending upon if the ground anchor 10 is adapted to be installed on the left or right side of the manufactured home. Since the ground anchors 10 in FIGS. 4A and 4B are mirror images only FIG. 4A will be described in greater detail but one skilled in the art will understand that such description is equally applicable to the ground anchor 10 depicted in FIG. 4B. The second anchor means 45 is fastened to the upper surface 55 of the ground contact plate 35 and is positioned outboard from the first anchor means 40. In one embodiment, the second and an means 45 is positioned within from about 0.25 to 1 inch from the ground contact plate 35 outer perimeter. The second anchor means 45 has a second longitudinal axis LA2 wherein the first longitudinal axis, LA1, and second longitudinal axis, LA2, are at an acute angle Ø. Desirably, the angle Ø is from about 5° to about 65°, or from about 10° to about 60°, or from about 15° to about 50°, or from about 20° to about 45°.

The second anchor means 45 may be fabricated from a substantially planar plate having a pair of substantially parallel upright sides 65 extending perpendicularly from and welded to the edges of the planar plate. Each side 65 includes a third co-axially aligned opening 70. The second anchor means 45 is designed to secure and engage with a longitudinal strut, described herein below, that has an opposing end fastened to an adjacent I-beam of the manufactured home. The third co-axially aligned openings 70 can be sized and shaped as needed but generally are from about 3/16 of an inch to about 3/4 of an inch in diameter, or from about 1/4 of an inch to about 17/32 of an inch in diameter.

Alternatively, the second anchor means 45 may be fabricated from a single piece of flat bar or stock being bent in a "U" shaped configuration forming the substantially parallel, spaced apart, upwardly orientated, i.e., away from the ground contact plate 35, sides 65. The openings 70 can first be drilled, punched or stamped at a predetermined location and configuration, such as, for example, round, square, rectangular, star, and the like, prior to the flat stock being bent into position and welded to the upper surface 55. The second anchor means 45 can be from about 2 to about 4 inches long, and from 1.5 to 5 inches wide, and each side from about 0.5 to about 4 inches in height; or from about 2 to about 4 inches long, from 1 to 3 inches wide, and each side from about 1 to about 3 inches in height. The opening 70 in the sides 65 can be from about 1/2 of an inch to about 1 inch from the top of the side 65.

Figure 5:
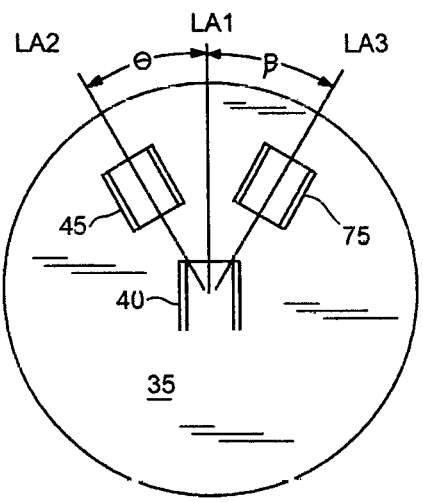
FIG. 5 is a top view of another embodiment of the invention adapted to be universally utilized on either end of a manufactured home.
Figure 6:
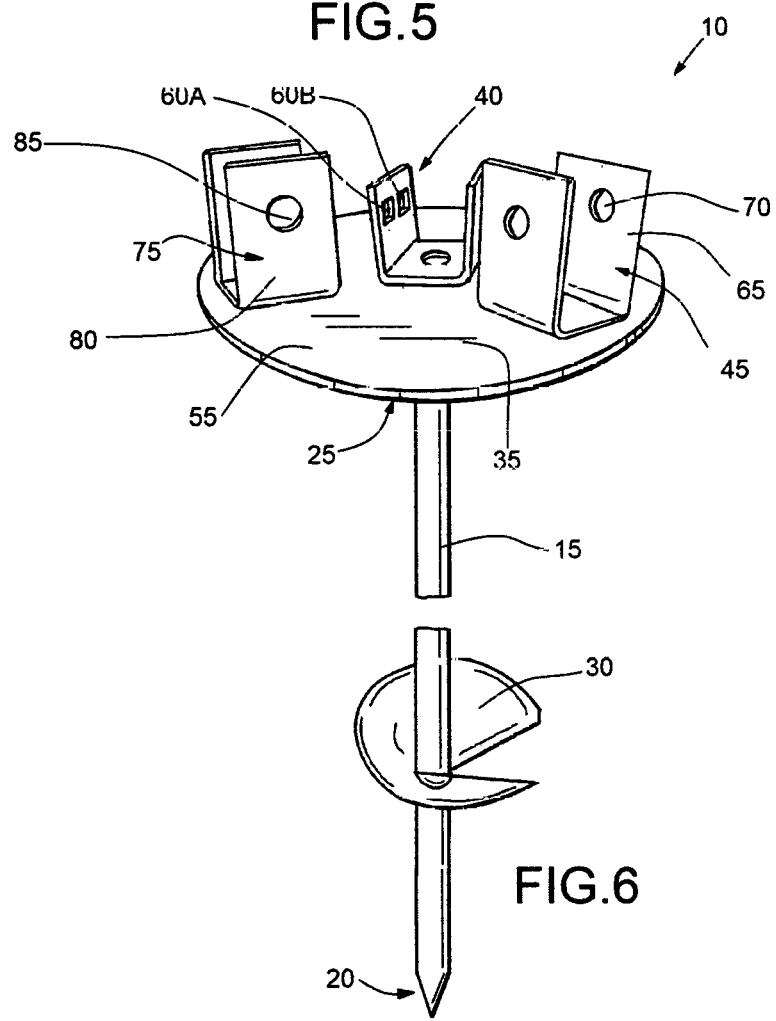
FIG. 6 is a perspective view of the embodiment illustrated in FIG. 5 of an augerable ground anchor of the present invention and being adapted for use on either end of a manufactured home.
Figure 7:
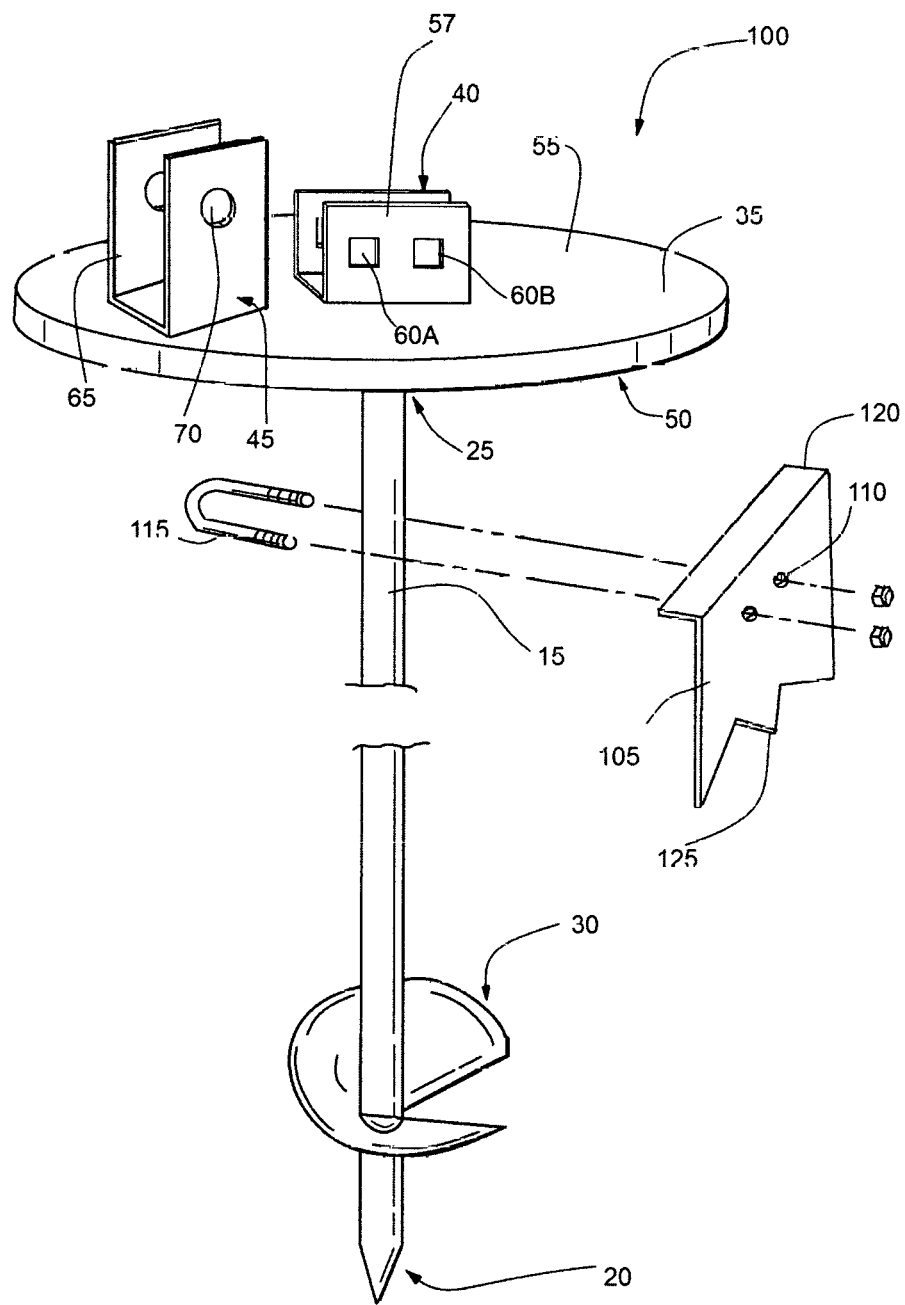
FIG. 7 is a perspective view of the anchoring and stabilizing assembly of the present invention.
Figure 8:
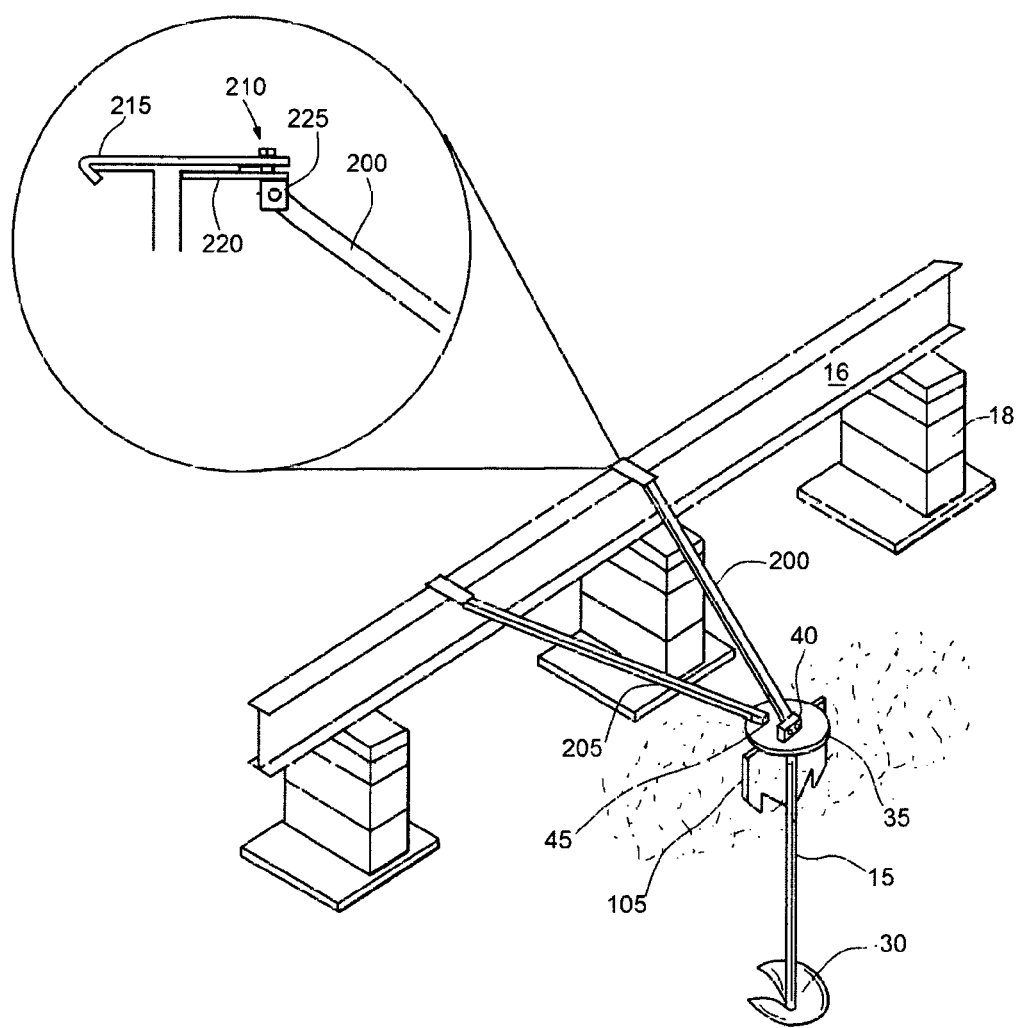
FIG. 8 is a perspective view of the anchoring and stabilizing assembly of the present invention as it would be installed and having stabilizing struts connected to and extending from the manufactured home I-beam to the first and second anchoring means.
Figure 9A:
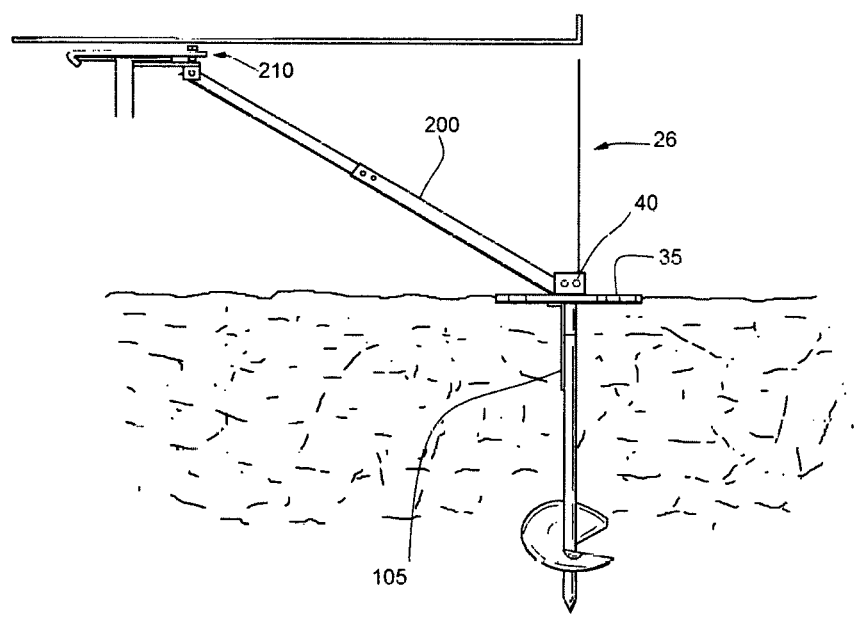
FIG. 9A is a side view of the anchoring and stabilizing assembly, as it would be installed further illustrating the manufactured home side tension strap affixed to the device of the present invention.
Figure 9B:
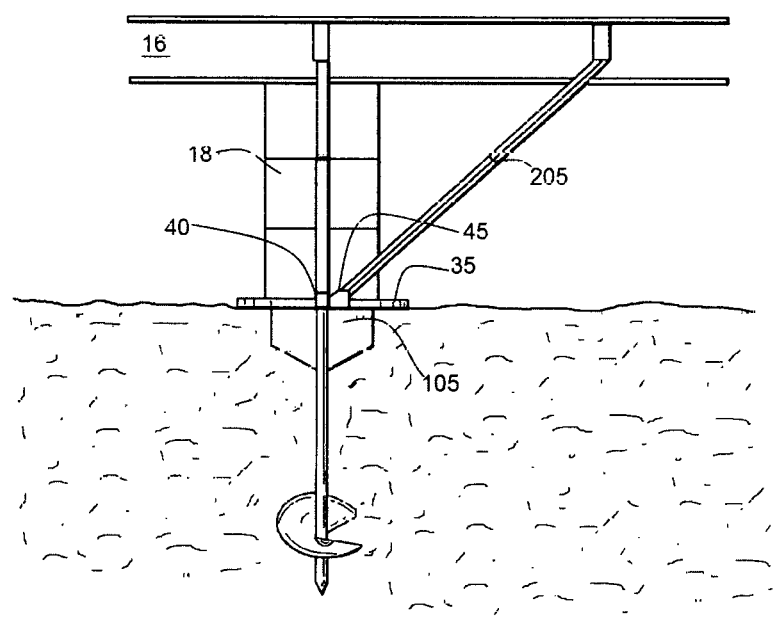
FIG. 9B is front view of the left side of a manufactured home illustrating the anchoring and stabilizing assembly, as it would be installed on the left side of the manufactured home.
Figure 9C:
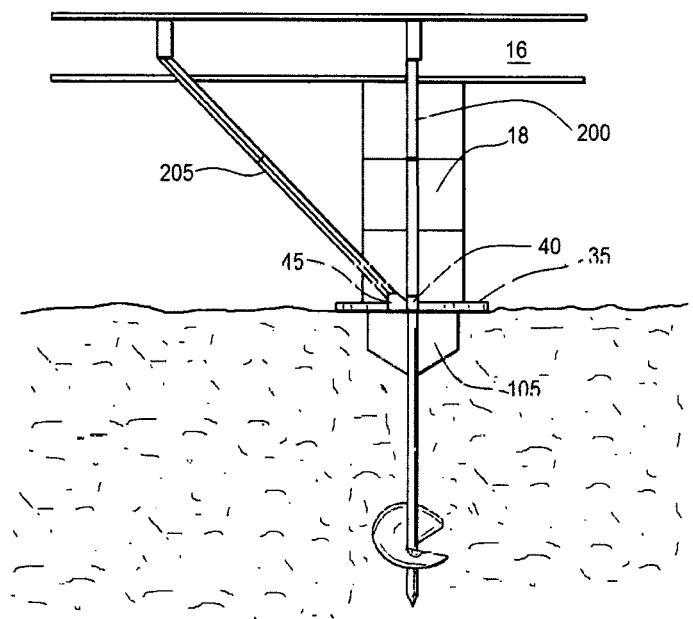
FIG. 9C is front view of the right side of a manufactured home illustrating the anchoring and stabilizing assembly, as it would be installed on the right side of the manufactured home.

Referring to FIGS. 5 and 6, another embodiment of the augerable ground anchor 10 of the present invention is illustrated. In this embodiment, in addition to having: a shaft 15 with a first end 20 and a distal second end 25; an angering means 30 affixed circumferentially about the shaft 15 and positioned adjacent to the first end 20; a ground contact plate 35 affixed to the shaft 15 at or proximate to the second end 25; a first anchor means 40 affixed to the contact plate 35 for securing a manufactured home sidewall strap to the ground anchor 10, and a second anchor means 45 for securing a manufactured home stabilizing strut to the ground anchor 10, the entire description of which is incorporated herein; the ground anchor 10 further includes a third anchoring means 75 attached to the upper surface 55 of the ground contact plate 35.

The third anchor means 75 is fastened to the upper surface 55 of the ground contact plate 35 and is positioned outboard from the first anchor means 40 and opposing the second anchor means 45. The third anchor means 75 is positioned within from about 0.25 to 1 inch from the ground contact plate 35 outer perimeter. The third anchor means 75 has a third longitudinal axis LA3 wherein the first longitudinal axis, LA1, and third longitudinal axis, LA3, are at a second acute angle β. Desirably, the angle β is from about 5° to about 65°, or from about 10° to about 60°, or from about 15° to about 50°, or from about 20° to about 45°.

Similar to the second anchor means 45, the third anchor means 75 may be fabricated from a substantially planar plate having a pair of substantially upright sides or flanges 80 extending perpendicularly from and welded to the edges of the planar plate. Each flange or side 80 includes a fourth co-axially aligned opening 85. The third anchor means 75 is designed to engage and secure and a longitudinal strut (not shown but known in the art) that has an opposing end fastened to an adjacent I-beam of the manufactured home. The fourth co-axially aligned openings 85 are similarly sized but generally are from about 3/16 of an inch to about 3/4 of an inch in diameter, or from about 1/4 of an inch to about 17/32 of an inch in diameter.

Alternatively, the third anchor means 75 may be fabricated from a single piece of flat bar bent in a "U" shaped configuration forming the spaced apart, upwardly directed, i.e., away from the ground contact plate 35, sides 80. The openings 85 can first be drilled, punched or stamped at a predetermined location and configuration, such as, for example, round, square, rectangular, star, and the like, prior to the flat bar being bent into position and welded to the upper surface 55. Alternatively, the third anchor mean can be formed into the desired configuration then the co-aligned openings 85 drilled or cut into the sides 80. The third anchor means 75 can be from about 2 to about 4 inches long, and from 1.5 to 5 inches wide, and each side from about 0.5 to about 4 inches in height; or from about 2 to about 4 inches long, from 1 to 3 inches wide, and each side from about 1 to about 3 inches in height. The opening 85 in the sides 80 are generally centered relative to the length of the side and are from about ½ of an inch to about 1 inch from the top of the side 80.

Referring to FIGS. 7-9C, an anchoring and stabilizing assembly 100 of the present invention is illustrated. The anchoring and stabilizing assembly 100 comprises the augerable ground anchor 10 as provided in any of the embodiments described above, the description of which are incorporated herein by reference, and further includes a stabilizing means or plate 105 that, in use, is positioned adjacent to and in contact with the shaft 15 and the ground contact plate 35. In another embodiment, the stabilizing assembly 100 includes a straddle means for maintaining a positional relationship of the stabilizing plate 105 to the shaft 15, i.e., for retaining the stabilizing plate 105 proximate to the shaft 15 while permitting the augerable ground anchor 10 to be driven into the ground during installation without horizontally displacing the stabilizing plate 105 from its desired position relative to the ground anchor and manufactured home. The straddle means comprises a pair of apertures or holes 110 in the stabilizing plate 105 that are co-aligned or registered with a connecting means 115, such as a U-bolt or threaded rod that in use would partially encircle the shaft 15. The ends or legs of the U-bolt 115 are inserted through or engage with the holes 110 of the stabilizing plate 105. The straddle means may include a nut on each leg of the U-bolt to maintain the positional relationship of the stabilizing plate 105 adjacent to the shaft 15 but still allow the shaft 15 to be driven into the ground without horizontally displacing the stabilizing plate 105 as the shaft is driven into the ground.

The stabilizing plate 105 may include a lip or bent portion 120 that facilitates driving of the stabilizing plate 105 into the ground as the ground contact plate 35 contacts the stabilizing plate 105. The lip 120 can be from about 0.25 to about 2.0 inches in length, or from about 0.3 to about 1.5 inches, or from about 0.5 to about 1 inch in length.

The stabilizing plate 105 can be fabricated from any suitable material but desirably is manufactured from plate steel having a thickness of from about 0.005 to about 0.5 of an inch, or from about 0.010 to about 0.45 of an inch, or from 0.150 to about 0.40 of an inch, or from about 0.160 to about 0.30 of an inch or from about 0.180 to about 0.25 of an inch and may have a protective coating on the surface to resist oxidation. Such coatings are known to those in the coatings art and include epoxy, powder coating, and hot dipped galvanizing.

The stabilizing plate 105 can have a length of from about 4 inches to about 20 inches, or from about 6 inches to about 18 inches, or from about 8 inches to about 15 inches, or from about 10 to about 14 inches, and can have at least one apex or point 125 that is disposed opposite to the lip or bend 120 and is adapted to facilitate driving the stabilizing plate 105 into the ground. Desirably, the apex of the stabilizing plate 105 is shaped substantially similar to that of an "M" thereby having a plurality of points of apexes 125 that facilitate the plate 105 being driven into the ground with a reduced force.

Referring more particularly to FIGS. 7-9C, another aspect of the present invention is provided, a method for stabilizing a manufactured home against longitudinal and lateral movement utilizing the anchoring and stabilizing assembly 100 of the present invention. The method includes the steps of: providing a manufactured home having a frame support structure having at least one and desirably comprising two parallel longitudinal I-beams 16 wherein the I-beams 16 are independently supported by a support means 18, such as a pier, the manufactured home further having a plurality of vertical sidewall tensioning straps 26; providing a anchoring and stabilizing assembly 100 of the present invention; driving the anchoring and stabilizing assembly 100 into the ground at a predetermined location wherein the first anchor means 40 is substantially perpendicular to one of the manufactured home I-beams 16 and the second anchor means 45 is positioned toward the I-beam; and securing a first stabilizing strut 200 to the first anchoring means 40 and at a first location on the I-beam and securing a second stabilizing strut 205 to the second anchoring means 45 and to a second location on the same I-beam.

When installing the anchoring and stabilizing assembly 100 into the ground, the first anchoring means 40 is utilized as a drive head for connecting to a drive tool whereby the anchoring and stabilizing assembly 100 is driven into the ground to a predetermined depth of from about 0.75 to about 1.5 feet from the underside of the ground contact plate 35. Stabilizing plate 105 is then attached to the shaft 15 using an attachment means 115, such as a U-bolt, that allows for the shaft to rotate while the stabilizing plate 105 remains in a substantially parallel orientation relative to the manufactured home's support I-beams. After attaching the stabilizing plate 105 to the shaft 15, the stabilizing plate 105 can be at least partially manually driven into the ground. The anchor 10 is then further driven into the ground until the ground contact plate 35 contacts the ground and the first attachment means 40 is orientated so that the longitudinal axis LA1 is substantially perpendicular to at least one of manufactured home's support I-beams and the second anchor means 45 is positioned toward the I-beam. The first anchor means is also in a substantially vertical alignment with at least one of the sidewall tension straps. As used herein the term "substantially" means from zero to not more than 25% variance, or less than 20°, or less than 15°, or less than 10° out of alignment with the respective I-beam or vertical tension strap of the manufactured home.

After the anchoring and stabilizing assembly 100 is set into the ground, a first end of a first stabilizing strut or lateral brace 200 is attached or affixed to one of the manufactured home's I-beams at a first location that is substantially perpendicular to the I-beam and a second end of the first stabilizing strut is attached to the first anchor means 40 to thereby effect lateral stability of the manufactured home.

The strut 200 is attached to the manufactured home using an I-beam attachment assembly 210 that is commercially available from Home Pride, Nashville, Ten. Generally, the I-beam attachment assembly 210 includes a J-hook member 215 that overlies the top of the I-beam and includes a curved portion that engages the lip of the I-beam and a secondary flat member 220 that is positioned adjacent to the opposing lip and interlocks the attachment assembly 210 to the I-beam. A U-shaped brace connector 225 for connecting one end of the lateral brace or strut 200 to the manufactured home is attached to the J-hook member 215 and secondary flat member 220 using an appropriate fastener such as a nut and bolt. The brace connector 225 is aligned with the first anchor means 40 for engaging the strut 200. The strut 200 includes an opening proximate to each end for pivotably mounting the strut to the I-beam via the I-beam attachment assembly 210 and for attaching a second end of the first stabilizing strut to the first anchor means 40 utilizing opening 60A. The strut 200 is secured to the U-shaped brace connector 225 and the first anchor means 40 using an appropriate fastener such as nut and bolt for each.

The connection of the longitudinal strut 205 to the same I-beam at a second location is effected in a similar manner, that is, a first end of the second stabilizing strut 205 is secured to the same I-beam at a second location and a second end of the second stabilizing strut 205 is secured to the second anchor means. In connecting the longitudinal strut 205 to the manufactured home I-beam the U-shaped brace connector 225 is aligned with the second anchor means 45 and affixed to the anchoring and stabilizing assembly 100 via the second anchor means 45 utilizing opening 70. The strut 205 is secured to the U-shaped brace connector 225 and the second anchor means 45 using an appropriate fastener such as nut and bolt for each.

The struts 200/205 are well known in the art and are commercially available from Home Pride, Nashville, Ten. Since the struts 200 and 205 are similar only one will be described. Generally, the strut 200 is adjustable in length and includes first and second elongated box tubes. The first box tube is adapted to longitudinally, telescopically engage with the second box tube so that the length of each strut can be independently adjusted as would be necessary in the field during installation of the braces. Typically, the first box tube has an inside dimension of from about 1.25 to about 2.0 inches and the second box tube has an outside dimension that is from about 0.01 to about 0.25 of an inch less than the inside dimension of the first box tube, or from about 0.05 to about 0.20 of an inch, or from about 0.10 to about 0.15 of an inch less than the inside dimension of the first box tube. Once the strut 200 is affixed to both the manufactured home I-beam and the respective anchor means on the anchoring and stabilizing assembly 100, the length of the strut 200 can be locked or fixed by inserting a locking means, such as a self-tapping metal screw or bolt, that threads into both the first and second box tubes, or by welding the first and second box tubes together at the outer junction of the tubes, or utilizing other methods known to those skilled in the art. Alternatively, the first box lube will have a plurality of openings or holes that are from about 0.005 to about 0.05 of an inch larger than the diameter of a self-lapping metal screw or bolt so that when the length of the strut is to be fixed, at least one self-tapping metal screw or bolt is inserted into at least one of the openings and driven or attached to the second box lube. One skilled in the art will recognize that the self-tapping metal screw or bolt should be of a quality and dimension that will withstand the projected shearing force that can be applied to the strut during periods of high winds or earth movement.

After the longitudinal and lateral struts are secured to the manufactured home's I-beam and the anchoring and stabilizing assembly 100, the side-wall tensioning strap 26 is then tensioned to the anchoring and stabilizing assembly 100 using a split bolt, as is known to those skilled in the art, that is inserted into opening 6013 and tensioned to a predetermined setting as would be required in the respective state's laws and regulations.

The present invention is illustrated in greater detail by the specific examples presented below. It is to be understood that these examples are illustrative embodiments and are not intended to be limiting of the invention, but rather are to be construed broadly within the scope and content of the appended claims. All parts and percentages in the examples are on a volume basis unless otherwise stated.

EXAMPLE

A test was conducted using a 26 foot, 8 inch wide by 52 foot long (not including tongue length) Town Homes, LLC manufactured home model 1386. The home was setup in accordance with the manufacturer's printed instructions and stabilized using the present invention as follows.

An anchor assembly in accordance with the present invention was installed substantially in a vertical orientation not exceeding 15 degrees from vertical and wherein the centrally positioned first anchor means was in substantially vertical alignment with a sidewall strap. An anchor assembly was positioned inboard from each corner of the home at a distance in accordance with the Florida Highway Safety and Motor Vehicles memorandum "Example Test Protocols for Mobile/Manufactured Homes Installation Components" dated Jul. 30, 2015, the entire disclosure of which is incorporated herein by reference.

To simulate appropriate loading conditions uplift was applied using nine (9) air operated hydraulic jacks placed on rollers beneath the frame of the house. Lateral loading was applied using two (2) hydraulic jacks using steel beams to evenly distribute the load to the house. The lateral load was measured using two (2) calibrated load cells. Longitudinal loading was applied utilizing the same method except only one hydraulic jack and calibrated load cell was used.

Horizontal movement of the house was determined using a total of four (4) plumb bobs, one on each corner of the home. Vertical movement of the house was determined using four (4) rulers mounted on a mirror fixed to the house with a wire horizontally run between two (2) bars fixed to the ground, one on each corner of the home. The accuracy of the rulers was 0.01 of an inch.

Load ratings were based on the HUD Manufactured Home Construction and Safety Standards, 24 CFR Part 3280. A safety factor of 1.5 times was applied. The tests were repeated 3 times. The results are presented in Tables 1 and 2 below.

TABLE 1

Lateral Test Results

| Loading (lbs) | | Test 1 | | Test 2 | | Test 3 | |
| --- | --- | --- | --- | --- | --- | --- | --- |
| Uplift | Horizontal | Uplift | Horizontal | Uplift | Horizontal | Uplift | Horizontal |
| 14,400 | 5,560 | 0.01 | 0.03 | 0.01 | 0.02 | 0.02 | 0.06 |
| 15,071 | 11,120 | 0.01 | 0.05 | 0.03 | 0.1 | 0.02 | 0.1 |
| 22,607 | 16,680 | 0.03 | 0.24 | 0.03 | 0.24 | 0.04 | 0.29 |
| 30,142 | 22,239 | 0.05 | 0.57 | 0.06 | 0.59 | 0.07 | 0.54 |
| 37,678 | 27,799 | 0.08 | 1.03 | 0.1 | 1.06 | 0.12 | 0.92 |
| 45,213 | 33,359 | 0.13 | 1.86 | 0.13 | 1.53 | 0.12 | 1.33 |
| 45,213 | 38,919 | | | | | 0.17 | 1.90 |
| 45,213 | 44,479 | | | | | 0.21 | 2.40 |

TABLE 2

Longitudinal Test Results

| Loading (lbs) | | Test 1 | | Test 2 | | Test 3 | |
| --- | --- | --- | --- | --- | --- | --- | --- |
| Uplift | Horizontal | Uplift | Horizontal | Uplift | Horizontal | Uplift | Horizontal |
| 14,400 | 3,500 | 0.01 | 0.06 | 0.01 | 0.05 | 0.01 | 0.02 |
| 15,071 | 8,200 | 0.02 | 0.10 | 0.01 | 0.07 | 0.01 | 0.06 |
| 22,607 | 12,300 | 0.02 | 0.20 | 0.02 | 0.21 | 0.01 | 0.17 |
| 30,142 | 16,400 | 0.01 | 0.55 | 0.03 | 0.80 | 0.01 | 0.50 |
| 37,678 | 20,500 | 0.04 | 1.30 | 0.05 | 1.38 | 0.01 | 0.99 |
| 45,213 | 24,600 | 0.10 | 2.39 | 0.06 | 2.02 | 0.04 | 1.49 |

The results of such tests concluded with the state of Florida approving the present invention for anchoring and stabilizing a manufactured home meeting the regulations set by the Department of Highway Safety and Motor Vehicles, Rules 15C-1.0105, 15C-1.0107 and 15C-1.0108 of the Florida Administrative Code.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. An anchoring and stabilizing assembly for longitudinally and laterally stabilizing a manufactured home, said assembly comprising:
   a. a shaft having a first end and a distal second end;
   b. an augering means affixed about said shaft adjacent to said first end;
   c. a ground contact plate affixed perpendicular to said shaft proximate to said second end;
   d. a first anchor means affixed to said contact plate for securing a manufactured home sidewall strap to said ground contact plate, said first anchor means being centrally positioned and having a first longitudinal axis;
   e. a second anchor means for securing a stabilizing strut to said ground anchor, said second anchoring means being affixed to said contact plate outboard from said first anchor means and having a second longitudinal axis, wherein said first and second longitudinal axis are co-planar and form a first acute angle Ø of from 20 to 45 degrees; and
   f. a stabilizing plate affixed to said shaft by a straddle means so that the stabilizing plate maintains a positional relationship relative to the ground anchor during installation.

2. The anchoring and stabilizing assembly of claim 1, wherein said augering means is a single helix having a radius of from 2 to 6 inches.

3. The anchoring and stabilizing assembly of claim 1, wherein said ground contact plate is circular and has a diameter of from 4 to 16 inches.

4. The anchoring and stabilizing assembly of claim 3, wherein said ground contact plate has a diameter of from 6 to 10 inches.

5. The anchoring and stabilizing assembly of claim 1, wherein said first anchor means includes a pair of substantially parallel sides configured in an elongated U-shape, and having a length of from 1 to 4 inches, a width of from 1 to 3 inches and each side has a height of from 1 to 4 inches, and wherein each side includes a first co-aligned registered aperture.

6. The anchoring and stabilizing assembly of claim 5, wherein each side of said first anchor means further includes a second co-aligned registered aperture.

7. The anchoring and stabilizing assembly of claim 1, wherein said second anchor means includes a pair of substantially parallel sides configured in an elongated U-shape, and having a length of from 2 to 4 inches, a width of from 1 to 3 inches, and each side has a height of from 1 to 3 inches, and wherein each side includes a third co-aligned registered aperture.

8. The anchoring and stabilizing assembly of claim 1, wherein said stabilizing plate includes at least one apex.

9. The anchoring and stabilizing assembly of claim 1, wherein said stabilizing plate includes a lip.

10. The anchoring and stabilizing assembly of claim 1, wherein said straddle means comprises a U-bolt that partially encircles said shaft and wherein said stabilizing plate includes a pair of apertures that are co-aligned or registered with ends or legs of said U-bolt, and wherein said ends engage with said co-aligned apertures to maintain said stabilizing plate in a positional relationship with said shaft.

* * * * *